United States Patent [19]

Bogert et al.

[11] 4,213,359

[45] Jul. 22, 1980

[54] FLUID JET CUTTER WITH CONFINED PASSAGEWAY FOR FLUID DISPOSAL

[75] Inventors: Clayton Bogert, Glen Rock; John D. Alexander, Hawthorne; Leonard Krautheim, Haledon, all of N.J.

[73] Assignee: Lever Manufacturing Co., Paterson, N.J.

[21] Appl. No.: 881,278

[22] Filed: Feb. 27, 1978

[51] Int. Cl.² ............................ B23B 1/00; B23B 5/14
[52] U.S. Cl. ......................................... 82/47; 82/50; 82/52; 82/102; 83/177
[58] Field of Search ..................... 82/46–48, 82/101, 102, 50, 52; 83/53, 177; 137/833

[56] References Cited

U.S. PATENT DOCUMENTS

| | | | |
|---|---|---|---|
| 1,699,760 | 1/1929 | Sherman | 83/53 |
| 3,433,260 | 3/1969 | Higgins | 137/833 |
| 3,513,868 | 5/1970 | Halbach et al. | 137/833 |
| 3,978,748 | 9/1976 | Leslie et al. | 83/177 |
| 3,985,848 | 10/1976 | Frische et al. | 83/177 |
| 4,137,804 | 2/1979 | Gerber et al. | 83/177 |
| 4,152,958 | 5/1979 | Bogert | 82/50 |

OTHER PUBLICATIONS

"Fluid Jet Cutter for Plastics", SPE Journal, Jul. 1972, vol. 28, No. 7, p. 5.

*Primary Examiner*—Leonidas Vlachos
*Attorney, Agent, or Firm*—Arthur A. March

[57] ABSTRACT

The shaped block in the path of the fluid from the nozzle of a high pressure fluid jet to be located below the material to be cut or slit by a jet including, preferably, a curvo-linear passage or bore through the block having an entry port aligned with the nozzle for receiving and directing the flow of fluid from the jet after it has slit the material and preventing the fluid from returning to or splashing upon the material after it has entered the passage and a replaceable slug for insertion into the block in the area where the high pressure fluid impinges as it enters the passage.

9 Claims, 7 Drawing Figures

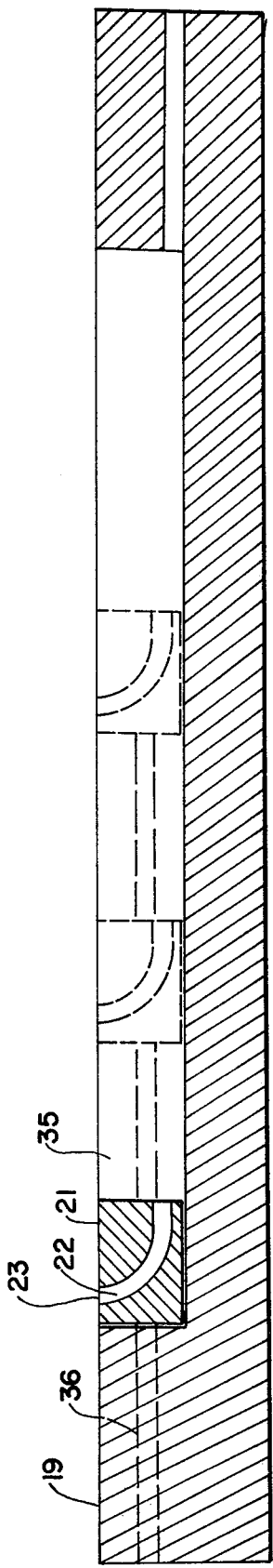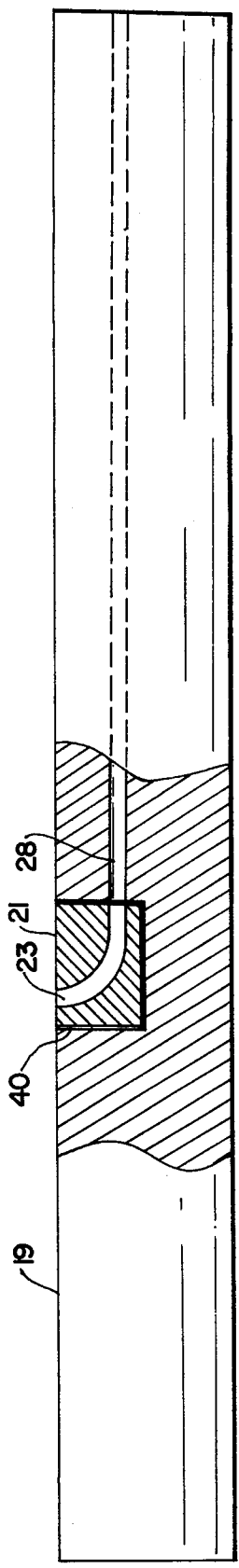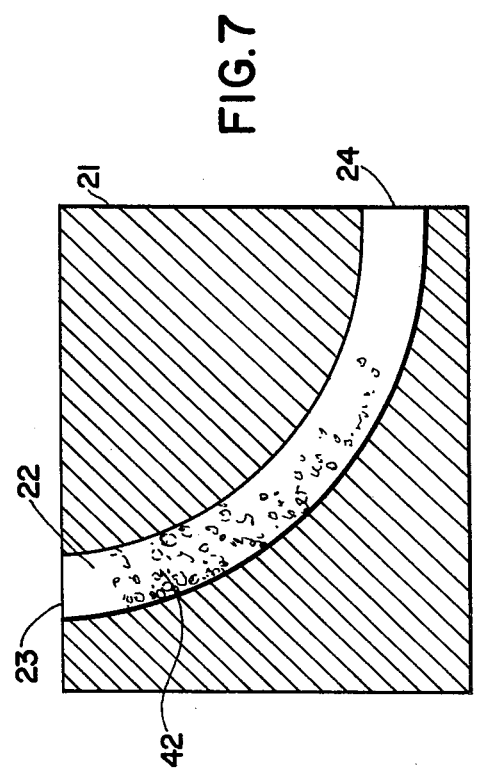

FLUID JET CUTTER WITH CONFINED PASSAGEWAY FOR FLUID DISPOSAL

BACKGROUND OF THE INVENTION

The present invention is directed to the slitting of rolls of material by means of a high pressure fluid jet. Specifically, the concept involves an apparatus and method in which the high pressure jet cuts into and through a roll of material during the relative rotation between the fluid jet and the roll of material and particularly to the confinement of the fluid against outward splashing after it has cut through the central core portion of the material.

The concept of the basic type of cutting or slitting apparatus here involved has been fully described in co-pending U.S. application Ser. No. 777,495 and now U.S. Pat. No. 4,152,958 of Bogert. In essence, this concept provides a fluid jet cutter apparatus combination arrangement for cutting a roll of material in situ and, more particularly, a fluid jet cutter means including a fluid jet nozzle, support means for operatively relatively rotationally supporting removably a roll of material to be cut in situ in a position along an axis in radially inwardly disposed relation to the nozzle for relative rotational movement between the roll of material and the nozzle about the axis, and fluid receiving means operatively disposed radially inwardly of the position of the roll of material for collecting spent fluid. The nozzle is selectively disposed in operatively flow aligned relation to the fluid receiving means at a point along the axis for causing a fluid jet exiting from the nozzle to cut circumferentially into and more or less radially through the roll of material in situ at such point and to be collected by the fluid receiving means during relative rotational movement between the nozzle and the roll of material.

The fluid jet cutter apparatus combination arrangement of the aforesaid application more specifically comprises liquid jet cutter means including a liquid jet nozzle, support means including a mandrel extending along a substantially horizontal axis for operatively rotationally supporting removably thereon the weight of a roll of material to be cut in situ in a position along the axis in radially inwardly disposed relation to the nozzle for relative rotation movement between the roll of material on the one hand and the nozzle and mandrel on the other hand about the axis, and further including rotation mounting means for mounting the roll of material for rotation about the axis and about the mandrel in said position, and a liquid receiving trough operatively disposed radially inwardly of the position of the roll of material and selectively defined in the periphery of the mandrel for collecting spent liquid, the nozzle being selectively disposed in operatively flow aligned relation to the trough at a point along the mandrel for causing a liquid jet exiting from the nozzle to cut circumferentially into and completely through the roll of material in situ at such point and to be collected by the trough during rotation of the roll of material. This arrangement solved many problems which were not overcome by the prior art which is exemplified by the patent disclosures of the following fluid jet cutting apparatus and methods: U.S. Pat. No. 1,699,760 to Sherman; U.S. Pat. No. 2,658,427 to VerDoot, Jr.,; U.S. Pat. No. 2,667,106 to Hyman et al U.S. Pat. No. 3,625,813 to Eckelman; U.S. Pat. No. 3,517,578 to Krofta; U.S. Pat. No. 3,532,014 to Franz; and U.S. Pat. No. 3,891,157 to Justus.

While, as aforesaid, this arrangement is highly advantageous, under certain conditions the water emanating from the jet nozzles could splash out of the aforesaid trough and have the undesirable result of wetting the core and, perhaps, a portion of the material of the roll around the core. The present invention is particularly directed to the concept of preventing the splashing of water emanating from the jet nozzles and directing their outward flow without any of the aforesaid potentially deleterious effects.

SUMMARY OF THE INVENTION

A fluid jet cutting apparatus is provided where structure eliminates the disadvantageous outward splashing of fluid resulting from the contact of the jet stream with outlet means. The apparatus is described and illustrated in connection with the slitting of rolls of material. However, its utilization is not limited thereto as the elimination of such splashing is highly desirable in any type of cutting operation using high pressure fluid water jets.

The fluid jet cutter apparatus includes a fluid jet nozzle, means for rotating and supporting a roll of material to be slit in situ along an axis radially inwardly disposed to the nozzle, and fluid receiving means located radially inwardly of the position of the fluid jet for diverting and collecting the fluid after the slitting or cutting is accomplished. The fluid receiving means comprises a block of rigid material having a curved passage therethrough. The curved passage has an entry port of relatively restricted size and an exit for the ultimate emission of the fluid passing therethrough.

The block of rigid material is disposed internally of the central core of the roll of material being slit and is preferably located in the supporting mandrel for the roll of material. The position of the block is such that the entry port for the reception of the fluid used to slit the roll of material is located at a point directly below the jet nozzle for the fluid or in aligned relation thereto so that at all times the entry port of the passageway in the rigid block is in position to directly receive the fluid from the fluid jet nozzle.

The passage through the block is so constructed that it is practically impossible for any fluid passing into the entry port from splashing back outwardly out of the curved passage. In other words, the curvature of the passage is such that it will accommodate the water under pressure from the fluid jet nozzle but nonetheless constitute itself, the means for blocking the splashing or return spray toward the interior of the material being slit. In certain instances, as a result of the tremendously high pressure emitted by the fluid jet, this particular area may be subject to wear and therefore a slug of material may be either permanently or replaceably disposed at the point of contact of the fluid under pressure with the interior wall of the curved passage. Thus this portion may be replaced after wear by a new shaped slug at minimal expense or the slug may be so constructed as to be very wear resistant. The water passing through the curved passage in the block is emitted from the exit in the block through a connected pipe, channel or any other means suitable for disposing of the spent fluid.

The invention contemplates the provision of the structured block containing the curved passage in direct receiving relation with the fluid emitted under pressure from the fluid jet at all times. As a consequence, the fluid jet nozzle and the receiving block with the curved passage may remain stationary with the entry port for the passage aligned with the nozzle while the roll of material is cut or slit progressively and the roll is sequentially moved over the mandrel to the various cutting stations. Thus, the fluid jet cutter and the receptacle would remain stationary during the lateral movement of the roll of material.

As an alternative to the foregoing arrangement, the fluid jet nozzle structure and the receiving block containing the curved passage may be movably linked as, for example, by electronic simultaneously operated piston means whereby the fluid jet cutter and the receiving block are moved together to remain in perfect alignment while progressing sequentially to each cutting or slitting station over the rotating roll of material while the latter does not move on a horizontal plane or laterally during the slitting operation.

Thus the inventive concept provides a confined passage of curvo-linear shape which eliminates any of the difficulties encountered by the splashing of the water on to the material with the consequent possible deleterious effect. The concept also contemplates the positioning of the receiving block and the entry port therein in direct communicating relation with the jet of fluid under pressure emanating from the nozzle. There is also a slug formed to provide a portion of the curved interior wall of the passage for the fluid so that whenever wear becomes a factor the entire block need not be replaced but only that portion of the block which is in direct contact with the high pressure fluid upon its entry into the curved passage.

It is to be understood that the drawings and the following description are set forth merely to facilitate an understanding of the invention and not in any way to be considered as a restriction on the scope thereof.

BRIEF DESCRIPTION OF THE DRAWINGS

FIG. 5 is a side view partially in section showing the block having the confined passage within a channel in the mandrel of the apparatus and also showing in dotted lines various positions of the block in the channel during operation.

FIG. 6 is a side view partially in section showing a block containing the confined passage in fixed position in a recessed portion of the mandrel.

FIG. 7 is a sectional view of the block with a confined passage showing the gurgitating action of the fluid through the passage.

DETAILED DESCRIPTION OF THE INVENTION

Figure 1:
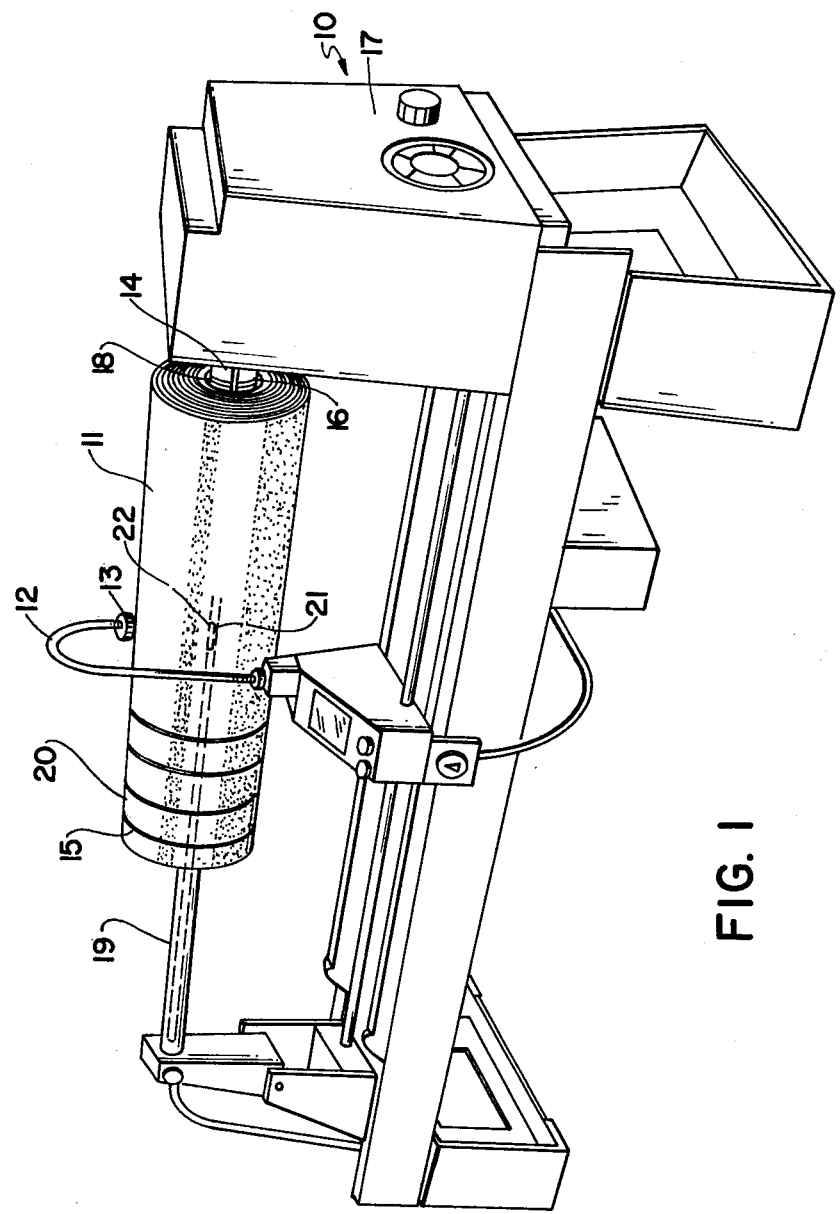
FIG. 1 is a schematic perspective view of a jet fluid slitting apparatus utilizing the block means having a confined passageway and showing in dotted line the position of the block with relation to the apparatus.

Referring to the drawing and more particularly FIG. 1, an apparatus 10 is shown for the fluid jet cutting of a roll of material 11 in situ by fluid jet cutter means 12. The fluid jet cutter has a nozzle 13 of selective orifice diameter positionable in operative generally radially inwardly facing relation to the roll of material 11 for the desired purpose. Support means 14 are provided for operatively relatively rotationally supporting the roll of material 11 which is to be cut in situ along an axis 15 in radially inwardly disposed relation to the nozzle 13 for relative rotational movement between the roll of material and the nozzle about such axis. The support means 14 generally includes rotational mounting means 16 which may be in the form of a conventional chuck drive connected for rotation either in forward or reverse direction at an infintely variable selective speed via conventional positive drive means (not shown) within housing 17 for mounting the roll of material 11 for rotation about the axis 15.

For the aforesaid purpose, the roll of material is provided usually with a central tubular core 18 on to which the continuous roll of material to be cut is pre-wound. In this way, a multiplicate wound or multiple ply more or less plain or spiral or helical winding type master roll or mill roll of material of selective width and circumference may be provided.

The support means 14 also include a core shaft or mandrel means such as a stationary mandrel 19 extending along the axis 7 for operatively supporting thereon the full weight of the roll of material 11 for relative rotational movement therebetween.

The jet nozzle 13 causes the fluid to be emitted or exit therefrom to cut circumferentially into and, more or less radially inwardly through the roll of material 11 in situ during relative rotational movement between the nozzle and the roll of material which is thereby cut into tapes 20, as illustrated in FIG. 1.

In the past, the fluid emitting from the nozzle 13 was of necessity collected and disposed of after cutting or slitting the roll of material 11 and the core 15. Heretofore when this fluid impinged upon and struck the wall of a trough or other collecting media, it did so with rebounding force because of the high pressure generated to perform the slitting operation. This rebound and gurgitation was uncontrollable and the fluid splashed upon and wetted the core 15 surrounding the point of impingement in the disposal receptacle. The force of the splashing, gurgitating fluid not only doused the core but in turn also wetted and, at times, soaked the material in the roll which surrounded the core. Under many conditions such as, for example, in the slitting of paper, cloth or other material, this wetting or soaking action had a deleterious and completely undesirable effect. As a consequence, while the use of this energy-saving and highly efficient fluid jet cutter could provide excellent results insofar as the cutting operation was concerned, nonetheless, it had certain drawbacks in connection with many types of material which were to be slit or cut.

The present invention overcomes the aforesaid problems by the provision of a block preferably of rigid material 21 provided with a shaped passage 22. As shown in FIGS. 2-5, the passage or bore 22 has an entry port 23 and an exit port 24 for the passage of the fluid emanating from the nozzle 13 of the fluid jet cutter. Obviously, the fluid will not enter the entry port 23 until the roll of material 11 and core 15 has been slit through. In this type of slitting operation this is rapidly accomplished.

According to the present invention, the passage or bore 22 is of a curvo-linear configuration. While this particular shape of bore has been shown and is being described, it is to be understood that this illustration is not to be considered as restrictive because any suitable configuration may be utilized which accomplishes the hereinafter described results. The curvo-linear configuration of the passage 22 causes the fluid 25 entering the bore 22 to impinge upon that portion 26 of the passage 22. The passage is so constructed that the fluid cannot bounce upwardly towards the entry port 23 or contact the core 15. Instead, because of the unique construction, the fluid gurgitates and bounces within the passage, first against the wall 27 of the passage and then outwardly in the direction of the arrow through exit port 24 and into and outlet pipe 28 or any other suitable type of ultimate conveyance means for the disposal of the fluid. As a consequence, with this curvo-linear bore or passage in the block, water will not splash back on to the core portion or wet or soak the roll of material 11 and thus the structure provides a unique and novel method for overcoming these difficulties aforedescribed.

It is to be noted that the block 21 is so located that the entry port 23 is aligned with the nozzle 13 in order that the fluid passing from the nozzle is directed into the passage 22 through entry port 23 and not to any other area of the apparatus.

Figure 4:
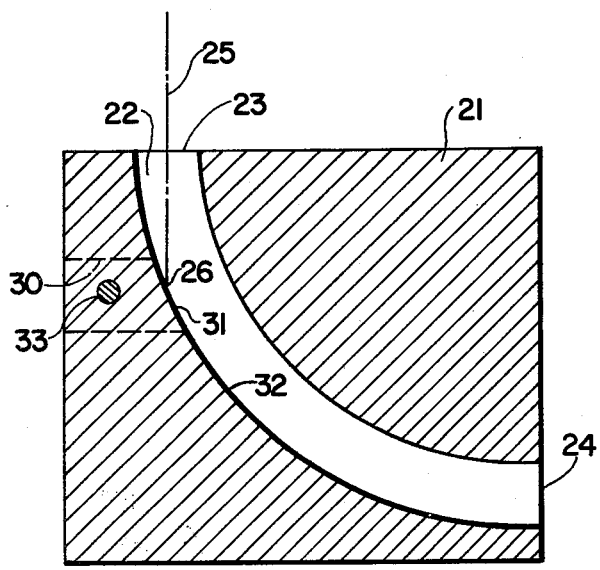
FIG. 4 is a sectional view of the block with the confined passage and showing a slug for the block shaped to form a portion of the passage.

The fluid is under relatively extensive pressure in order to accomplish the slitting operation and as a consequence the material of the block, no matter how durable, may be inclined to wear under the high impinging force of the jet fluid at the point 26 in the passage 22 where the fluid makes direct contact with the interior wall of said passage. The present invention also contemplates eliminating the requirement for costly replacement of the entire block 21 and instead provides a replaceable slug 30 in the block as shown in FIG. 4. While the slug 30 has been illustrated in a particular form and as being replaceable, it will be understood that any other suitable form may be utilized to accomplish the desired result. The slug may be either permanently mounted or be replaceable in any one of the forms used. Herein the term "slug" is used in the broader sense to include all sizes and forms thereof.

One edge 31 of the slug 30 is pre-shaped so as to conform to the shape of the interior wall 32 of the passage 22 at the point where the slug is disposed in the block 21. The slug 30 may be of similar material to the remainder of the block and can be secured within the block by any suitable means such as, for example, the bolt 33. As a consequence of this innovate structure, the entire block need not be replaced when wear occurs at the point 26 of impingement of the fluid in the passageway 22.

As aforesaid, it is essential that the block of material be so positioned that the entry port 23 is at all times in direct alignment and communication with the nozzle 13 so that the fluid will pass directly into passage 22. This alignment may be maintained in any manner desired but, in connection with the present apparatus, it is preferably established by either of two methods of operation, i.e. that shown in FIG. 5 or that shown in FIG. 6.

In FIG. 5 the block 21 is disposed in a channel 35 provided in the mandrel 19. With this apparatus arrangement, the block 21 and the fluid jet cutter 12 are moved together in timed relation by means of associated pistons 36 which are automatically moveable through the controls in the apparatus. The sequence is such that each time a slit through the roll of material 11 is accomplished, the jet cutting apparatus 12 and the block 30 are simultaneously moved to the next slitting station where the block, shown in dotted lines in FIG. 5, is directly below the fluid jet cutter whose position at that point is also shown in dotted lines. This sequential action continues through the slitting stations until the entire roll of material 11 is slit into the desired size tapes 20 whereupon it is removed from the roll in the conventional fashion described in co-pending Application Ser. No. 777,495. The fluid passing through passage 22 ultimately flows through the channel 35 in the mandrel for disposition.

With the apparatus shown in FIG. 6, the block 30 and fluid jet cutter 12 remain stationary. Thus, the alignment between the nozzle 13 and the entry port 23 is always maintained so that fluid may be directed into the passageway 22. The mandrel 19 has a machined out recess 40 of sufficient size to accommodate and frictionally maintain the block 30 in its appropriate position below the nozzle 13. In this instance, the fluid is ultimately emitted from the passage in the block through the outlet pipe 28.

With this construction, the roll of material is sequentially moved on a horizontal plane over the mandrel and below the fluid jet cutter from slitting station to slitting station. This lateral movement of the roll of material over the mandrel is accomplished in a manner well-known in the slitting art which requires no elaboration.

As a consequence with the use of the foregoing invention, as illustrated clearly in FIG. 7, the gurgitating fluid 42 under pressure passes from the entry port 23 through the exit port 24 confined within the passage or bore 22 and does not splash upon or make contact with the core 15 or any portion of the roll of material 11. Thus a vexing problem in the use of highly desirable fluid jet cutting devices has been solved by the present invention.

Figure 2:
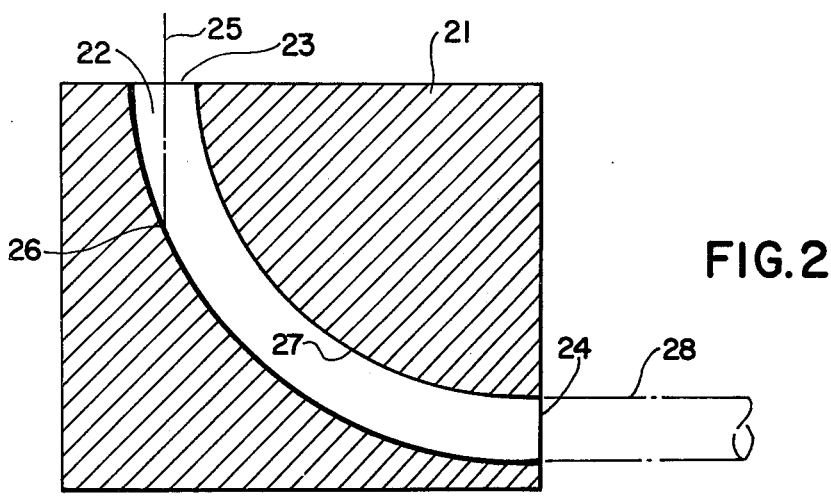
FIG. 2 is a sectional view of the block showing the curvo-linear confined passage.
Figure 3:
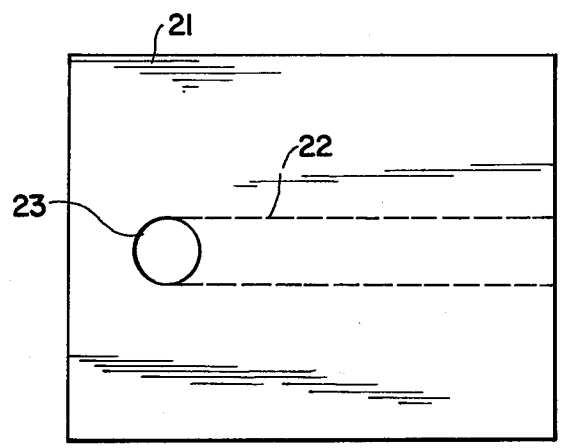
FIG. 3 is a top view of the block showing the fluid entry port and in dotted lines the curvo-linear passage.

As is clear from the drawings, and especially FIGS. 2 to 4, the passage 22 includes the curvo-linear conduit portion arranged between the entry and exit ports 23 and 24 and lying in a common plane therewith, e.g. the plane of the paper in FIGS. 2 and 4, and with the curved impingement portion 26 in alignment with the entry port 23 for receiving the spent fluid and for directing such fluid substantially linearly continuously farther along the conduit portion to the exit port 24. The passage 22 may be of substantially uniform flow cross section and have confining walls progressively extending incrementally remotely from the entry port 23 along the curvo-linear distance from the entry port to the exit port whereby the spent fluid is prevented from bouncing upwardly toward the entry port and instead bounces against the opposing wall portion at the curved impingement portion and then outwardly through the exit port.

While the invention has been described in detail with reference to certain embodiments thereof, it is to be understood that this description and the accompanying illustration is solely to enhance the understanding of the invention and does not in any way limit the scope of the invention which is as set forth in the appended claims.

I claim:

1. A shaped block for receiving the steady flow of a substantially continuous stream of fluid from the nozzle of a high pressure fluid jet after the fluid has passed through material to be cut or slit, including an entry port, an exit port and a flow diverting passage therebetween for directing the flow of the fluid after entering the entry port out of its normal incoming flow path to prevent the return of the fluid through the entry port back to the material which has been cut or slit, and means for supporting a fluid jet nozzle in operative flow aligned relation to the entry port of the shaped block and in spaced disposition thereto sufficiently for accomodating therebetween the material to be cut or slit, said flow diverting passage including a curvo-linear conduit portion between the entry port and exit port and lying in a common plane with such entry port and exit port and having a curved impingement portion in alignment with the entry port for receiving the spent fluid and for directing such fluid substantially linearly continuously farther along such conduit portion to the exit port.

2. Shaped block according to claim 1 wherein the flow diverting passage is of substantially uniform flow cross section and has confining walls progressively extending incrementally remotely from the entry port along the curvo-linear distance from the entry port to the exit port whereby the spent fluid is prevented from bouncing upwardly toward the entry port and instead bounces against the opposing wall portion at the curved impingement portion and then outwardly through the exit port.

3. The shaped block of claim 1 in which the block is rigid.

4. The shaped block of claim 1 including means at the exit port for engaging a pipeline for dispersing the liquid passing from the passage out of the block.

5. A shaped block for receiving the steady flow of a substantially continuous stream of fluid from the nozzle of a high pressure fluid jet after the fluid has passed through material to be cut or slit, including an entry port, an exit port and a curvo-linear flow diverting passage therebetween for directing the flow of the fluid after entering the entry port out of its normal incoming flow path to prevent the return of the fluid through the entry port back to the material which has been cut or slit, and further including a recess in the body of the block and a slug having a wall shaped for said recess to form a part of the passage in the block below the entry port at the point where the high pressure fluid impinges upon the passage.

6. The shaped block of claim 5 in which the slug is removeable.

7. Fluid jet cutter structure for cutting a roll of material in situ comprising fluid jet cutter means including a fluid jet nozzle, support means for operatively relatively rotationally supporting removably a roll of material to be cut in situ in a position along an axis in radially inwardly disposed relation to the nozzle for relative rotational movement between the roll of material and the nozzle about the axis, and fluid receiving means operatively disposed radially inwardly of the position of the roll of material for collecting spent fluid comprising a shaped block for receiving the steady flow of a substantially continuous stream of fluid from the nozzle of the high pressure fluid jet after the fluid has passed through material to be cut or slit, and including an entry port, an exit port and a flow diverting passage therebetween for directing the flow of the fluid after entering the entry port out of its normal incoming flow path to prevent the return of the fluid through the entry port back to the material which has been cut or slit, the nozzle being selectively disposed in operatively flow aligned relation to the receiving means at a point along the axis for causing a fluid jet exiting from the nozzle to cut circumferentially into and through the roll of material in situ at such point and be collected by the receiving means during relative rotational movement between the nozzle and the roll of material, said flow diverting passage including a curvo-linear conduit portion between the entry port and exit port and lying in a common plane with such entry port and exit port and having a curved impingement portion in alignment with the entry port for receiving the spent fluid and for directing such fluid substantially linearly continuously farther along such conduit portion to the exit port.

8. The fluid jet cutter structure of claim 7 including means for longitudinally moving said fluid jet cutter and said shaped block.

9. The fluid jet cutter structure of claim 7 including means adapted for longitudinally moving said roll of material with relation to said fluid jet cutter.